US012467934B2

(12) United States Patent
Hashimoto et al.

(10) Patent No.: US 12,467,934 B2

(45) Date of Patent: Nov. 11, 2025

(54) AUTOMATIC ANALYZING DEVICE

(71) Applicant: CANON MEDICAL SYSTEMS CORPORATION, Tochigi (JP)

(72) Inventors: Shozo Hashimoto, Nasushiobara (JP); Tomohiro Sugimura, Otawara (JP); Masahiro Masubuchi, Yaita (JP); Takashi Goto, Nasushiobara (JP); Yasuo Akizawa, Nasushiobara (JP)

(73) Assignee: CANON MEDICAL SYSTEMS CORPORATION, Tochigi (JP)

( * ) Notice: Subject to any disclaimer, the term of this patent is extended or adjusted under 35 U.S.C. 154(b) by 769 days.

(21) Appl. No.: 17/655,641

(22) Filed: Mar. 21, 2022

(65) Prior Publication Data

US 2022/0308079 A1 Sep. 29, 2022

(30) Foreign Application Priority Data

Mar. 23, 2021 (JP) ................................ 2021-048226

(51) Int. Cl.
*G01N 35/02* (2006.01)

(52) U.S. Cl.
CPC .................................. *G01N 35/025* (2013.01)

(58) Field of Classification Search
CPC ....... G01N 35/025; G01N 2035/00673; G01N 35/0092; G01N 2035/0446; G01N 35/1002
See application file for complete search history.

(56) References Cited

U.S. PATENT DOCUMENTS

| | | | | |
|---|---|---|---|---|
| 6,193,933 | B1 * | 2/2001 | Sasaki | G01N 35/1002 422/537 |
| 2018/0364267 | A1 * | 12/2018 | Shinohara | G01N 35/10 |
| 2019/0128907 | A1 * | 5/2019 | Tahara | G01N 21/78 |
| 2020/0406264 | A1 * | 12/2020 | Tahara | G01N 35/1002 |

FOREIGN PATENT DOCUMENTS

| | | | |
|---|---|---|---|
| JP | 58-208665 | A | 12/1983 |
| JP | 60-231172 | A | 11/1985 |
| JP | 11-258243 | A | 9/1999 |
| JP | 2000-266759 | A | 9/2000 |
| JP | 2009-068993 | A | 4/2009 |
| JP | 2015-161526 | A | 9/2015 |
| JP | 2018-132416 | A | 8/2018 |
| JP | 2021-4732 | A | 1/2021 |

OTHER PUBLICATIONS

Japanese Notice of Reasons for Refusal issued Sep. 25, 2025 in Japanese Patent Application No. 2021-048226, 4 pages.
Japanese Office Action issued on Feb. 26, 2025 in Japanese Patent Application No. 2021-048226, 4 pages.

* cited by examiner

*Primary Examiner* — Jennifer Wecker
*Assistant Examiner* — Britney N. Washington
(74) *Attorney, Agent, or Firm* — Oblon, McClelland, Maier & Neustadt, L.L.P.

(57) ABSTRACT

An automatic analyzing device according to an embodiment of the present disclosure includes a reagent cartridge and processing circuitry. The reagent cartridge includes a storing unit storing therein a reagent, a flow path for dispensing the reagent from the storing unit, and a dispensing mechanism configured to dispense the reagent into a reaction cuvette through the flow path. The processing circuitry is configured to control the dispensing mechanism so as to dispose of the reagent in the flow path.

14 Claims, 9 Drawing Sheets

ANALYZING DEVICE
70
PROCESSING DEVICE
90
DRIVING DEVICE
80
1
1a
2
2a
3
4
5
6
6a
7
7a
10
11
12
13
16
16a
16b
16c
110a
110b

AUTOMATIC ANALYZING DEVICE

CROSS-REFERENCE TO RELATED APPLICATIONS

This application is based upon and claims the benefit of priority from Japanese Patent Application No. 2021-048226, filed on Mar. 23, 2021; the entire contents of which are incorporated herein by reference.

FIELD

Embodiments described herein relate generally to an automatic analyzing device.

BACKGROUND

For example, an automatic analyzing device is configured to cause a specimen dispensing probe to aspirate a specimen from a specimen container and dispense the specimen into a reaction cuvette. Further, the automatic analyzing device is configured to dispense a reagent into the reaction cuvette in which the specimen has been dispensed and to perform a measuring process on a liquid mixture of the specimen and the reagent. However, when the reagent used in the measuring process has degraded quality, there is a possibility that obtained measurement results may not be correct.

DETAILED DESCRIPTION

An automatic analyzing device according to an embodiment of the present disclosure includes a reagent cartridge and processing circuitry. The reagent cartridge includes a storing unit storing therein a reagent, a flow path for dispensing the reagent from the storing unit, and a dispensing mechanism configured to dispense the reagent into a reaction cuvette through the flow path. The processing circuitry is configured to control the dispensing mechanism so as to dispose of the reagent in the flow path.

Exemplary embodiments of an automatic analyzing device will be explained in detail, with reference to the accompanying drawings. Possible embodiments are not limited to the embodiments described below. Further, in principle, the description of each of the embodiments is similarly applicable to any other embodiment.

Figure 1:
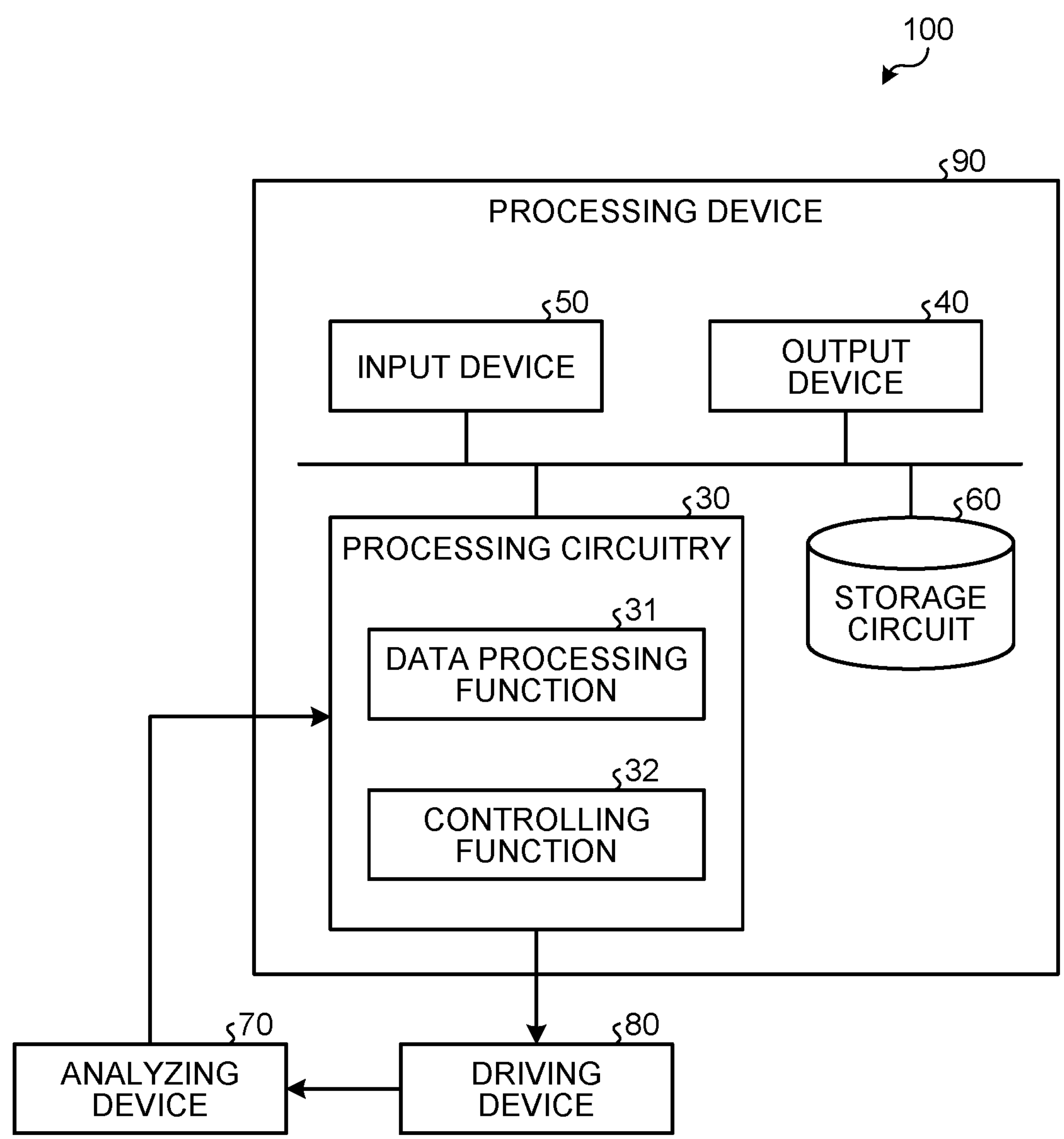
FIG. 1 is a block diagram illustrating an exemplary configuration of an automatic analyzing device according to an embodiment of the present disclosure.

FIG. 1 is a block diagram illustrating an exemplary configuration of an automatic analyzing device 100 according to the present embodiment. The automatic analyzing device 100 illustrated in FIG. 1 includes an analyzing device 70, a driving device 80, and a processing device 90.

The analyzing device 70 is configured to generate standard data and tested data, by performing a measuring process on liquid mixtures in each of which a standard specimen of any of various test items or a tested specimen (a biological specimen such as blood or urine) collected from an examined subject is mixed with a reagent used for an analysis of the test item. The analyzing device 70 includes a plurality of units configured to dispense the specimens, to dispense the reagent, and the like. The driving device 80 is configured to drive the units of the analyzing device 70. The processing device 90 is configured to bring the units of the analyzing device 70 into operation, by controlling the driving device 80.

The processing device 90 includes an input device 50, an output device 40, processing circuitry 30, and a storage circuit 60.

The input device 50 includes inputting devices such as a keyboard, a mouse, a button, a touch key panel, and/or the like and is configured to input information for setting analysis parameters of the test items and to input information for setting tested identification information and the test items of the tested specimen.

The output device 40 includes a printer and a display device. The printer is configured to print data generated by the processing circuitry 30. The display device is a monitor using a Cathode Ray Tube (CRT), a liquid crystal panel, or the like and is configured to display data generated by the processing circuitry 30.

The storage circuit 60 is, for example, a semiconductor memory element such as a Random Access Memory (RAM) or a flash memory, or a storage device such as a hard disk or an optical disk.

The processing circuitry 30 is configured to control the entirety of a system. For example, as illustrated in FIG. 1, the processing circuitry 30 is configured to execute a data processing function 31 and a controlling function 32. The controlling function 32 is configured to bring the units of the analyzing device 70 into operation, by controlling the driving device 80. The data processing function 31 is configured to generate calibration data and analysis data of each of the test items, by processing the standard data and the tested data generated by the analyzing device 70.

For example, the standard data generated by the analyzing device 70 denotes data (a calibration curve or a standard curve) for determining an amount or the density of a substance. The tested data generated by the analyzing device 70 denotes data of a result from the measuring process performed on the tested specimen. Further, the calibration data output from the processing circuitry 30 denotes data indicating a result of the measuring process such as the amount or the density of the substance derived from the tested data and the standard data. The analysis data output from the processing circuitry 30 denotes data indicating a result of determining positive or negative. In other words, the calibration data is data for deriving the analysis data indicating the result of determining positive or negative.

In this situation, for example, processing functions executed by constituent elements of the processing circuitry 30 are recorded in the storage circuit 60 in the form of computer-executable programs. The processing circuitry 30 is a processor configured to realize the functions corresponding to the programs by reading and executing the programs from the storage circuit 60. In other words, the processing circuitry 30 that has read the programs has the functions illustrated within the processing circuitry 30 in FIG. 1.

Although the example is explained with reference to FIG. 1 in which the single piece of processing circuitry (the processing circuitry 30) realizes the processing functions described below, it is also acceptable to structure processing circuitry by combining together a plurality of independent processors, so that the functions are realized as a result of the processors executing the programs.

The term "processor" used in the above explanations denotes, for example, a Central Processing Unit (CPU), a Graphics Processing Unit (GPU), or a circuit such as an Application Specific Integrated Circuit (ASIC) or a programmable logic device (e.g., a Simple Programmable Logic Device [SPLD], a Complex Programmable Logic Device [CPLD], or a Field Programmable Gate Array [FPGA]). When the processor is a CPU, for example, the processor realizes the functions by reading and executing the programs saved in the storage circuit 60. In contrast, when the processor is an ASIC, for example, instead of the programs being saved in the storage circuit 60, the programs are directly incorporated in the circuit of the processor. Further, the processors of the present embodiments do not each necessarily have to be structured as a single circuit. It is also acceptable to structure one processor by combining together a plurality of independent circuits, so as to realize the functions thereof. Further, it is also acceptable to integrate two or more of the constituent elements in FIG. 1 into a single processor, so as to realize the functions thereof.

Figure 2:
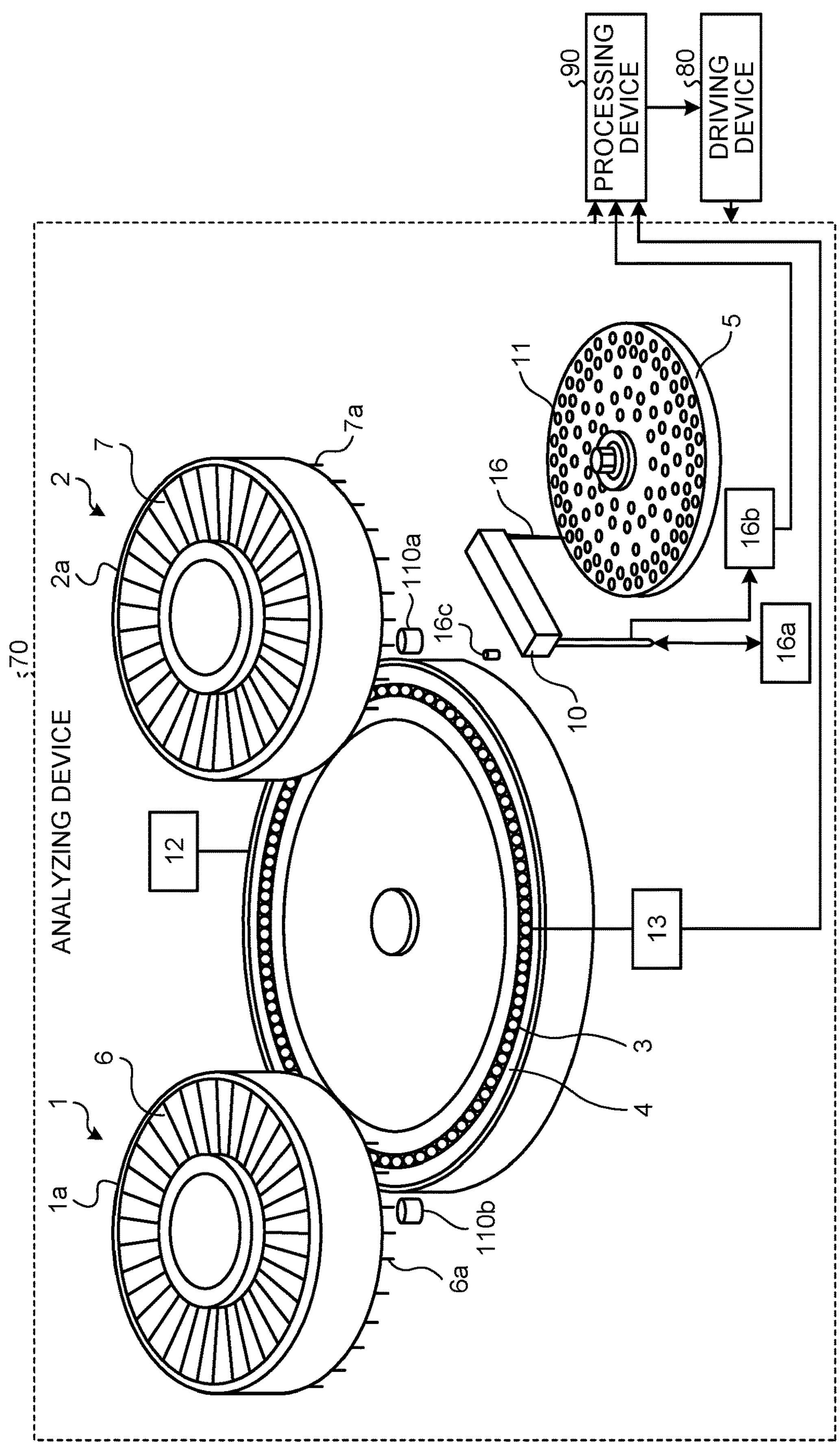
FIG. 2 is a drawing illustrating an exemplary configuration of an analyzing device of the automatic analyzing device according to the present embodiment.

FIG. 2 is a drawing illustrating an exemplary configuration of the analyzing device 70 of the automatic analyzing device 100 according to the present embodiment.

The analyzing device 70 includes a sample disk 5 holding a plurality of specimen containers 11. Each of the specimen containers 11 stores therein a specimen such as the standard specimen of any of the various test items or the tested specimen.

The analyzing device 70 further includes a plurality of reaction cuvettes 3 arranged on a circumference and a reaction disk 4 rotatably holding each of the plurality of reaction cuvettes 3. For example, the reaction disk 4 has a constant temperature tank configured to maintain the liquid in the reaction cuvettes 3 at constant temperature and a plate-like member covering the constant temperature tank. The plate-like member has formed therein recess parts corresponding to the reaction cuvettes 3. In this situation, the constant temperature tank may be a water tank or an air tank. When the constant temperature tank is a water tank, the constant temperature tank stores therein water having constant temperature.

Further, the analyzing device 70 includes a specimen dispensing probe 16, a specimen dispensing arm 10, a specimen dispensing pump unit **16*a*, a detector 16*b*, and a cleaning tank 16*c*. The specimen dispensing probe 16 is configured to dispense the specimens. More specifically, the specimen dispensing probe 16 is configured to aspirate the specimen from any of the specimen containers 11 held by the sample disk 5 with respect to each of the test items and to dispense the specimen into one or more of the reaction cuvette 3 in an amount set as an analysis parameter of the corresponding test item. The specimen dispensing arm 10 is configured to support the specimen dispensing probe 16 so as to be rotatable and movable in up-and-down directions. The specimen dispensing pump unit 16*a* is configured to allow the specimen dispensing probe 16 to aspirate and dispense the specimen. The detector 16*b* is configured to determine that the liquid surface of the specimen is detected when a tip end part of the specimen dispensing probe 16 which has descended from above the liquid surface comes close to or comes into contact with the liquid surface, in any of the specimen containers 11 held by the sample disk 5. More specifically, the detector 16*b* is electrically connected to the specimen dispensing probe 16 and is configured to detect the liquid surface on the basis of a change in electrostatic capacitance occurring when the tip end part of the specimen dispensing probe 16 comes close to or comes into contact with the liquid surface in any of the specimen containers 11. Upon detection of the liquid surface in any of the specimen containers 11, the specimen dispensing pump unit 16*a* is configured to allow the specimen dispensing probe 16 to aspirate the specimen and to subsequently allow the specimen dispensing probe 16 to dispense the specimen into one or more of the reaction cuvettes 3. Every time the dispensing of the specimen is finished, the cleaning tank 16*c* is configured to clean the specimen dispensing probe 16**.

The analyzing device 70 further includes a plurality of reagent cartridges 6, a reagent storage 1 storing therein each of the plurality of reagent cartridges 6, a plurality of reagent cartridges 7, and another reagent storage 2 storing therein each of the plurality of reagent cartridges 7. Each of the reagent cartridges 6 stores therein a reagent containing a component that reacts with a component of at least one of the test items contained in a specimen. For example, each of the reagent cartridges 6 stores therein a reagent of a one-reagent system or a first reagent of a two-reagent system. The reagent storage 1 includes a reagent rack **1*a* serving as a turn table rotatably holding the reagent cartridges 6 corresponding to the test items. Each of the reagent cartridges 7 stores therein a second reagent of a two-reagent system for at least one of the test items. The reagent storage 2 includes a reagent rack 2*a* serving as a turn table rotatably holding the reagent cartridges 7** corresponding to the test items.

The reagent cartridges 6 and 7 include a dispense unit **6*a* and a dispense unit 7*a*, respectively, and are each configured to dispense, through the dispense unit 6*a*, 7*a*, the reagent in an amount set as an analysis parameter of at least one of the test items, into a corresponding one of the reaction cuvettes 3**.

The analyzing device 70 further includes a measuring unit 13 and a reaction cuvette cleaning unit 12. The measuring unit 13 is configured to perform a measuring process on a liquid mixture by radiating light onto each of the reaction cuvettes 3 storing therein the liquid mixture of a specimen and a reagent. More specifically, the measuring unit 13 is configured to radiate the light onto one of the rotating reaction cuvettes 3 positioned at a measurement position and to detect light that has passed through the liquid mixture of the specimen and the reagent in the reaction cuvette 3 as a result of the radiation. After that, the measuring unit 13 is configured to generate the standard data or the tested data expressed with a digital signal by processing a detected signal and to further output the generated data to the processing circuitry 30 of the processing device 90. The reaction cuvette cleaning unit 12 is configured to clean the inside of any of the reaction cuvettes 3 on which the measuring unit 13 has finished performing the measuring process.

The analyzing device 70 further includes disposal units 110*a* and 110*b*. The disposal units 110*a* and 110*b* are provided in the vicinity of the reagent storage 1 and the reagent storage 2, respectively. The disposal units 110*a* and 110*b* will be explained later.

The driving device 80 is configured to drive the units of the analyzing device 70.

The driving device 80 includes a mechanism configured to drive the sample disk 5 of the analyzing device 70 and is configured to move the specimen containers 11. Further, the driving device 80 includes a mechanism configured to drive the reagent rack 1*a* of the reagent storage 1 and is configured to rotate the reagent cartridges 6. Furthermore, the driving device 80 includes a mechanism configured to drive the reagent rack 2*a* of the reagent storage 2 and is configured to rotate the reagent cartridges 7. Also, the driving device 80 includes a mechanism configured to drive the reaction disk 4 and is configured to rotate the reaction cuvettes 3.

Further, the driving device 80 includes a mechanism configured to rotate and to move up and down the specimen dispensing arm 10 and is configured to move the specimen dispensing probe 16 between the specimen containers 11 and the reaction cuvettes 3. Further, the driving device 80 includes a mechanism configured to drive the specimen dispensing pump unit 16*a* and is configured to allow the specimen dispensing probe 16 to dispense a specimen. In other words, the driving device 80 is configured to allow the specimen dispensing probe 16 to aspirate the specimen from any of the specimen containers 11 and dispense the specimen into one or more of the reaction cuvettes 3.

A controlling function 32 of the processing device 90 is configured to bring the units of the analyzing device 70 into operation by controlling the driving device 80.

Figure 3:
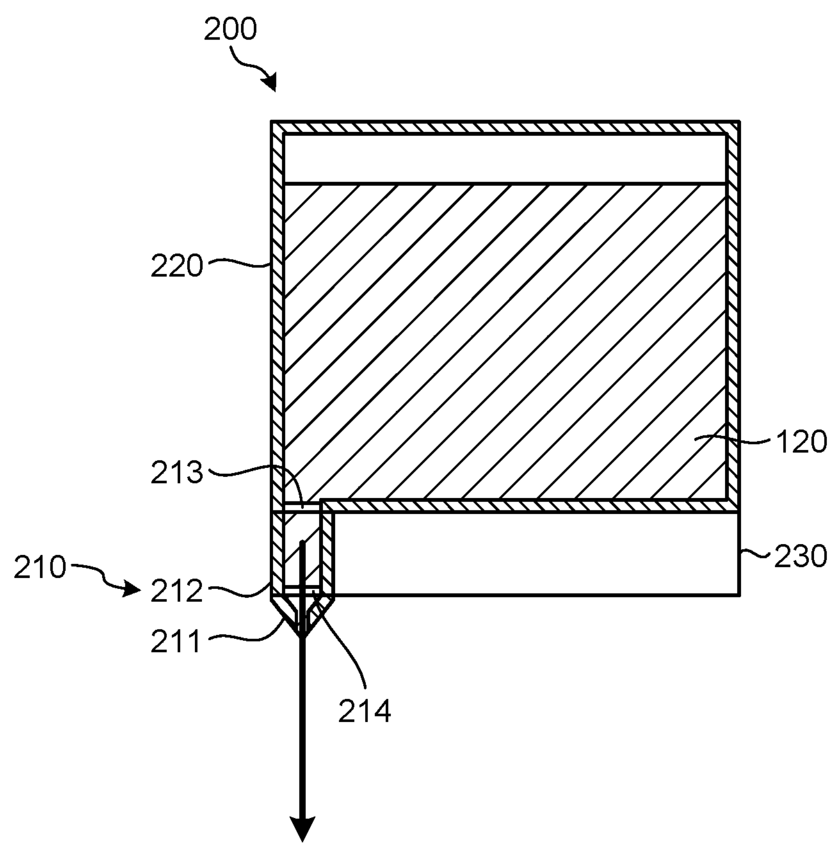
FIG. 3 is a lateral cross-sectional view illustrating an exemplary configuration of a reagent cartridge applied to the automatic analyzing device according to the present embodiment.

FIG. 3 is a lateral cross-sectional view illustrating an exemplary configuration of a reagent cartridge 200 applied to the automatic analyzing device 100 according to the present embodiment. The reagent cartridge 200 illustrated in FIG. 3 corresponds to any of the reagent cartridges 6 and 7 illustrated in FIG. 2.

As illustrated in FIG. 3, the reagent cartridge 200 is, for example, a reagent cartridge provided with a dispensing mechanism and includes a dispense unit 211, a supply unit 212, valves 213, 214, a storing unit 220, and a dispensing mechanism 230. The storing unit 220 is a container storing therein a reagent. For example, the storing unit 220 is formed by using metal or a polymer material. The dispense unit 211 corresponds to either of the dispense units 6*a* and 7*a* illustrated in FIG. 2.

The supply unit 212 is provided between the storing unit 220 and the dispense unit 211. The supply unit 212 is configured to supply the reagent in the storing unit 220 to the dispense unit 211. The dispense unit 211 is configured to dispense the reagent supplied from the supply unit 212. The valve 213 is provided between the supply unit 212 and the storing unit 220. The valve 213 is a check valve configured to prevent a backward flow in the direction from the supply unit 212 to the storing unit 220. Further, the valve 214 is provided between the dispense unit 211 and the supply unit 212. The valve 214 is a check valve configured to prevent a backward flow in the direction from the dispense unit 211 to the supply unit 212. In this situation, the dispense unit 211, the supply unit 212, and the valves 213 and 214 structure a flow path 210 for dispensing reagent 120 from the storing unit 220.

For example, the dispensing mechanism 230 is structured with a pump or the like and is configured to dispense the reagent 120. The dispensing mechanism 230 is provided in at least a part of a lateral wall of the supply unit 212 and is configured to change the shape of the lateral wall of the supply unit 212 as being driven by the driving device 80.

For example, the controlling function 32 of the processing device 90 is configured to output, to the driving device 80, a control signal to increase the volume of the supply unit 212 by driving the dispensing mechanism 230. In response to the control signal, the driving device 80 is configured to allow the dispensing mechanism 230 to change the shape of the lateral wall of the supply unit 212 in a direction such that the volume of the supply unit 212 increases. As a result, the valve 213 opens due to a decrease in the pressure inside the supply unit 212 so that the reagent 120 in the storing unit 220 flows into the supply unit 212.

In another example, the controlling function 32 of the processing device 90 is configured to output, to the driving device 80, a control signal to decrease the volume of the supply unit 212 by driving the dispensing mechanism 230. In response to the control signal, the driving device 80 is configured to allow the dispensing mechanism 230 to change the shape of the lateral wall of the supply unit 212 in a direction such that the volume of the supply unit 212 decreases. As a result, in FIG. 3, the valve 214 opens due to an increase in the pressure inside the supply unit 212 so that the reagent in the supply unit 212 is dispensed from the dispense unit 211 and supplied to any of the reaction cuvettes 3. In other words, the reagent 120 is dispensed into one or more of the reaction cuvettes 3. After that, the measuring unit 13 is configured to perform the measuring process on the liquid mixture of a specimen and the reagent 120 in the one or more of the reaction cuvettes 3.

For example, in automatic analyzing devices, when a reagent container is stored in a reagent storage while in an opened state after transport, the reagent in the reagent container easily deteriorates as a result of coming into contact with air. In contrast, in the automatic analyzing device 100 according to the present embodiment, because the reagent cartridge 200 is not opened after transport, it is possible to prevent the reagent 120 from coming into contact with air and to thus prolong the life of the reagent. However, even when the reagent cartridge 200 is used in the automatic analyzing device 100, the reagent 120 in the flow path 210 comes into contact with air, and there is a possibility that the quality of the reagent 120 may become lower. For example, the reagent 120 that is in contact with air may have lower quality for reasons such as a change in the density allowed by evaporation, oxidization, contamination, a deposition of a reagent component, and/or the like. When the reagent 120 of which the quality has become lower is used in the measuring process, there is a possibility that obtained measurement results may not be correct.

To cope with this situation, the automatic analyzing device 100 according to the present embodiment is configured as described below for the purpose of improving efficiency in the measuring process. The automatic analyzing device 100 according to the present embodiment includes the reagent cartridge 200 and the controlling function 32. The reagent cartridge 200 includes the storing unit 220 configured to store the reagent 120 therein, the flow path 210 for dispensing the reagent 120 from the storing unit 220, and the dispensing mechanism 230 configured to dispense the reagent 120 into any of the reaction cuvettes 3 through the flow path 210. The controlling function 32 is configured to control the dispensing mechanism 230 so as to dispose of the reagent 120 in the flow path 210.

Next, a disposal process to dispose of the reagent 120 performed by the automatic analyzing device 100 according to the present embodiment will be explained.

Figure 4:
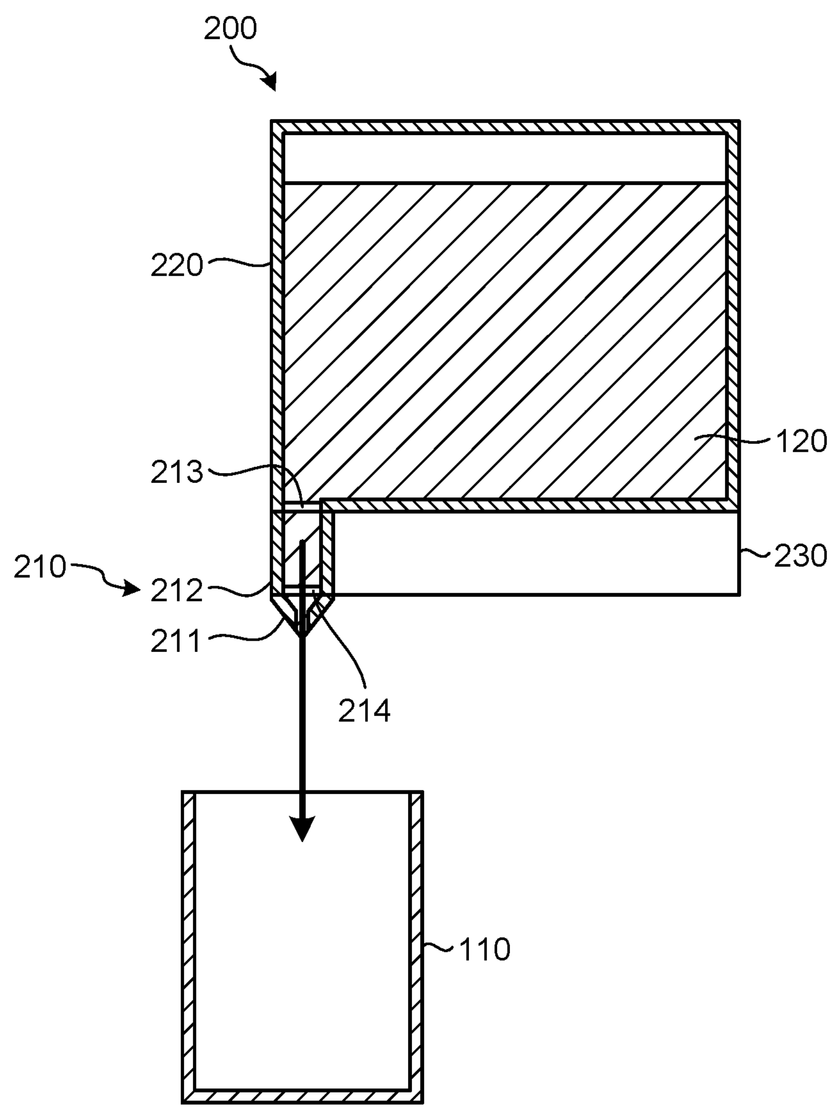
FIG. 4 is a drawing for explaining a disposal process performed by the automatic analyzing device according to the present embodiment, presented as a cross-sectional view illustrating configurations of a reaction cuvette, the reagent cartridge, and a disposal unit.

FIG. 4 is a drawing for explaining the disposal process performed by the automatic analyzing device 100 according to the present embodiment, presented as a cross-sectional view illustrating configurations of the reagent cartridge 200 and a disposal unit 110.

As illustrated in FIG. 4, the automatic analyzing device 100 according to the present embodiment includes the disposal unit 110. The disposal unit 110 is provided in the vicinity of a reagent storage. For example, the disposal unit 110 is positioned on a rotation track of a reagent rack serving as a turn table configured to rotatably hold the reagent cartridge 200 in the reagent storage.

The disposal unit 110 is a container used for disposing of the reagent 120 in the reagent cartridge 200. An opening is formed in an upper part of the disposal unit 110. In the present example, the disposal unit 110 corresponds to either of the disposal units 110*a* and 110*b* illustrated in FIG. 2.

For example, in the automatic analyzing device 100 according to the present embodiment, when a set time period has elapsed since the reagent 120 in the reagent cartridge 200 was dispensed, the reagent 120 in the flow path 210 of the reagent cartridge 200 is disposed of into the disposal unit 110. More specifically, when the set time period has elapsed since the reagent 120 was dispensed, the controlling function 32 of the processing device 90 is configured to output, to the driving device 80, a control signal to dispose of the reagent 120 in the flow path 210 of the reagent cartridge 200. In response to the control signal, the driving device 80 is configured to rotate the reagent cartridge 200 to an installation position of the disposal unit 110, so that the dispense unit 211 of the reagent cartridge 200 is positioned above the disposal unit 110. After that, the driving device 80 is configured to drive the dispensing mechanism 230 of the reagent cartridge 200, so that the reagent 120 in the flow path 210 of the reagent cartridge 200 is disposed of into the disposal unit 110.

In this situation, in the disposal process to dispose of the reagent 120, information is set in advance indicating whether or not the reagent 120 is to be disposed of regarding the reagent 120 in the flow path 210. The controlling function 32 of the processing device 90 is configured to record the information in the storage circuit 60 as setting information. When "disposal" is set as the setting information of the reagent 120, one type of information is set by being selected from between: "disposal (immediately)" indicating that the reagent 120 is to be disposed of immediately; and "disposal (before use)" indicating that the reagent 120 is to be disposed of before use. Further, when "disposal" is set as the setting information of the reagent 120, the controlling function 32 is configured to record the set time period in the storage circuit 60 so as to be kept in correspondence with the setting information of the reagent 120. The setting information and the set time period may be set in advance with respect to each type of reagent 120 or each of the test items or may be set by a user.

Further, when the reagent 120 is a reagent that does not easily deteriorate, "disposal" is not set as the setting information. Also, when being set with a set time period "0", the reagent 120 will not be disposed of. In that situation, it is not necessary to set "disposal" as the setting information.

Further, the controlling function 32 of the processing device 90 is configured to start clocking after the reagent 120 is dispensed and to record a value indicating a clocked result in the storage circuit 60 as an unused time period of the reagent 120, so as to be kept in correspondence with the setting information and the set time period of the reagent 120.

Figure 5:
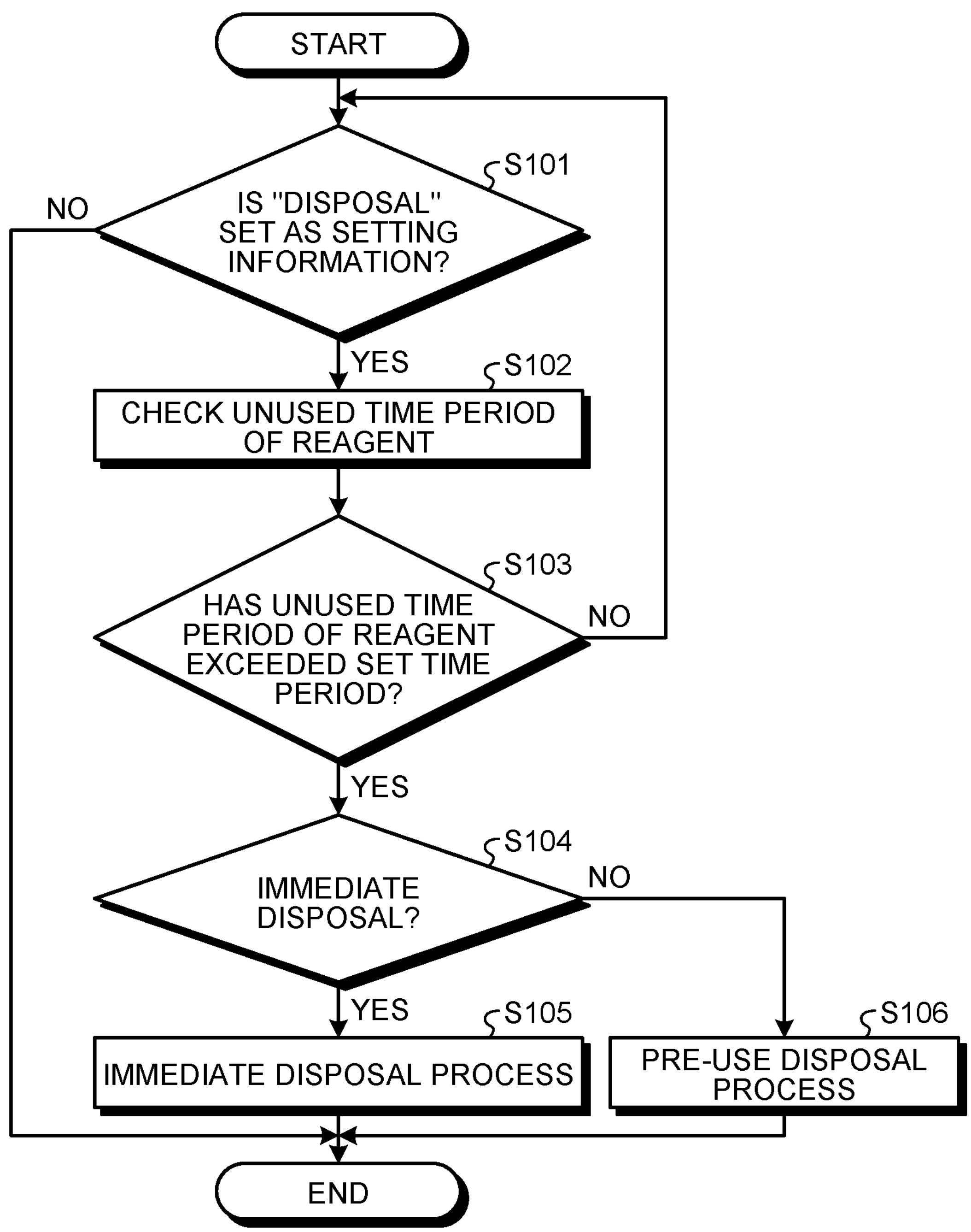
FIG. 5 is a flowchart illustrating the disposal process performed by the automatic analyzing device according to the present embodiment.

FIG. 5 is a flowchart illustrating the disposal process performed by the automatic analyzing device 100 according to the present embodiment.

In the disposal process, at first, after the reagent 120 in the reagent cartridge 200 is dispensed, the controlling function 32 refers to the storage circuit 60 to check to see whether or not "disposal" is set as the setting information of the reagent 120 (step S101). When "disposal" is not set as the setting information (step S101: No), the disposal process ends.

On the contrary, when "disposal" is set as the setting information of the reagent 120 in the reagent cartridge 200 (step S101: Yes), the controlling function 32 refers to the storage circuit 60 to check the unused time period kept in correspondence with the setting information of the reagent 120 (step S102).

Subsequently, the controlling function 32 refers to the storage circuit 60 and checks to see whether or not the unused time period of the reagent 120 in the reagent cartridge 200 has exceeded the set time period (step S103). When the unused time period of the reagent 120 has not exceeded the set time period (step S103: No), step S101 is performed.

On the contrary, when the unused time period of the reagent 120 in the reagent cartridge 200 has exceeded the set time period (step S103: Yes), the controlling function 32 refers to the storage circuit 60 and checks to see whether or not the "disposal" set as the setting information is "disposal (immediately)" indicating that the disposal is to occur immediately (step S104). In this situation, when the "disposal" set as the setting information is "disposal (immediately)" indicating that the reagent 120 is to be disposed of immediately, the controlling function 32 performs an immediate disposal process (step S105).

In the immediate disposal process (step S105), the controlling function 32 outputs, to the driving device 80, a control signal to dispose of the reagent 120 in the flow path 210 of the reagent cartridge 200. In response to the control signal, the driving device 80 rotates the reagent cartridge 200 to the installation position of the disposal unit 110, so that the dispense unit 211 of the reagent cartridge 200 is positioned above the disposal unit 110. Further, the driving device 80 drives the dispensing mechanism 230 of the reagent cartridge 200 so that the reagent 120 in the flow path 210 of the reagent cartridge 200 is disposed of into the disposal unit 110. Subsequently, the controlling function 32 informs the user by outputting, to the output device 40, information indicating that the reagent 120 in the flow path 210 of the reagent cartridge 200 was immediately disposed of.

In contrast, when the "disposal" set as the setting information is "disposal (before use)" indicating that the reagent 120 is to be disposed of before use, the controlling function 32 performs a pre-use disposal process (step S106).

In the pre-use disposal process (step S106), before the reagent 120 in the reagent cartridge 200 is dispensed, the controlling function 32 outputs, to the driving device 80, a control signal to dispose of the reagent 120 in the flow path 210 of the reagent cartridge 200. In response to the control signal, the driving device 80 rotates the reagent cartridge 200 to the installation position of the disposal unit 110, so that the dispense unit 211 of the reagent cartridge 200 is positioned above the disposal unit 110. Further, the driving device 80 drives the dispensing mechanism 230 of the reagent cartridge 200, so that the reagent 120 in the flow path 210 of the reagent cartridge 200 is disposed of into the disposal unit 110. Subsequently, the controlling function 32 informs the user by outputting, to the output device 40, information indicating that the reagent 120 in the flow path 210 of the reagent cartridge 200 was disposed of before use.

In this situation, in the pre-use disposal process, for example, when the reagent 120 in the flow path 210 of the reagent cartridge 200 is to be disposed of, the controlling function 32 performs the pre-use disposal process in an idle cycle during which the reagent 120 is not dispensed. Further, when there is no idle cycle, the controlling function 32 makes an idle cycle for dispensing the reagent 120. For example, the controlling function 32 makes the idle cycle before the reagent 120 in the flow path 210 of the reagent cartridge 200 is disposed of. Further, in the idle cycle, the controlling function 32 outputs, to the driving device 80, a control signal to dispose of the reagent 120 in the flow path 210 of the reagent cartridge 200. In that situation, as a result of the driving device 80 driving the reagent cartridge 200 in response to the control signal, the reagent 120 in the flow path 210 of the reagent cartridge 200 is disposed of into the disposal unit 110 during the idle cycle.

Further, the pre-use disposal process may also be applied when the reagent cartridge 200 is replaced with a new reagent cartridge. For example, when the reagent cartridge 200 has been replaced with the new reagent cartridge, the controlling function 32 outputs, to the driving device 80, a control signal to dispose of the reagent 120 in the flow path 210 of the new reagent cartridge 200 (hereinafter, "post-replacement reagent cartridge 200") during the idle cycle. In that situation, as a result of the driving device 80 driving the post-replacement reagent cartridge 200 in response to the control signal, the reagent 120 in the flow path 210 of the post-replacement reagent cartridge 200 is disposed of into the disposal unit 110 during the idle cycle. After that, the controlling function 32 informs the user by outputting, to the output device 40, information indicating that the reagent 120 in the flow path 210 of the post-replacement reagent cartridge 200 was disposed of before use.

As explained above, in the automatic analyzing device 100 according to the present embodiment, the reagent cartridge 200 includes the storing unit 220 storing therein the reagent 120; the flow path 210 for dispensing the reagent 120 from the storing unit 220, and the dispensing mechanism 230 configured to dispense the reagent 120 into the reaction cuvette 3 through the flow path 210. The controlling function 32 is configured to control the dispensing mechanism 230 so as to dispose of the reagent 120 in the flow path 210. With this configuration, when the reagent 120 is dispensed next time, the reagent 120 having degraded quality will not be used in the measuring process. For example, if the reagent 120 used in the measuring process had degraded quality, obtained measurement results might not be correct. In contrast, in the present embodiment, when the set time period has elapsed since the reagent 120 in the reagent cartridge 200 was dispensed, for example, the reagent 120 in the flow path 210 of the reagent cartridge 200 is disposed of. Accordingly, when the reagent 120 is dispensed next time, the reagent 120 of which the quality is not degraded will be used in the measuring process. It is therefore possible to improve efficiency in the measuring process.

Other Embodiments

Certain embodiments have thus been explained. It is, however, acceptable to carry out the present disclosure in various different modes other than those described in the above embodiments.

First Modification Example

In the automatic analyzing device 100 according to a first modification example of the present embodiment, the reagent 120 in the flow path 210 of the reagent cartridge 200 is disposed of, by rotating a disposal unit.

Figure 6A:
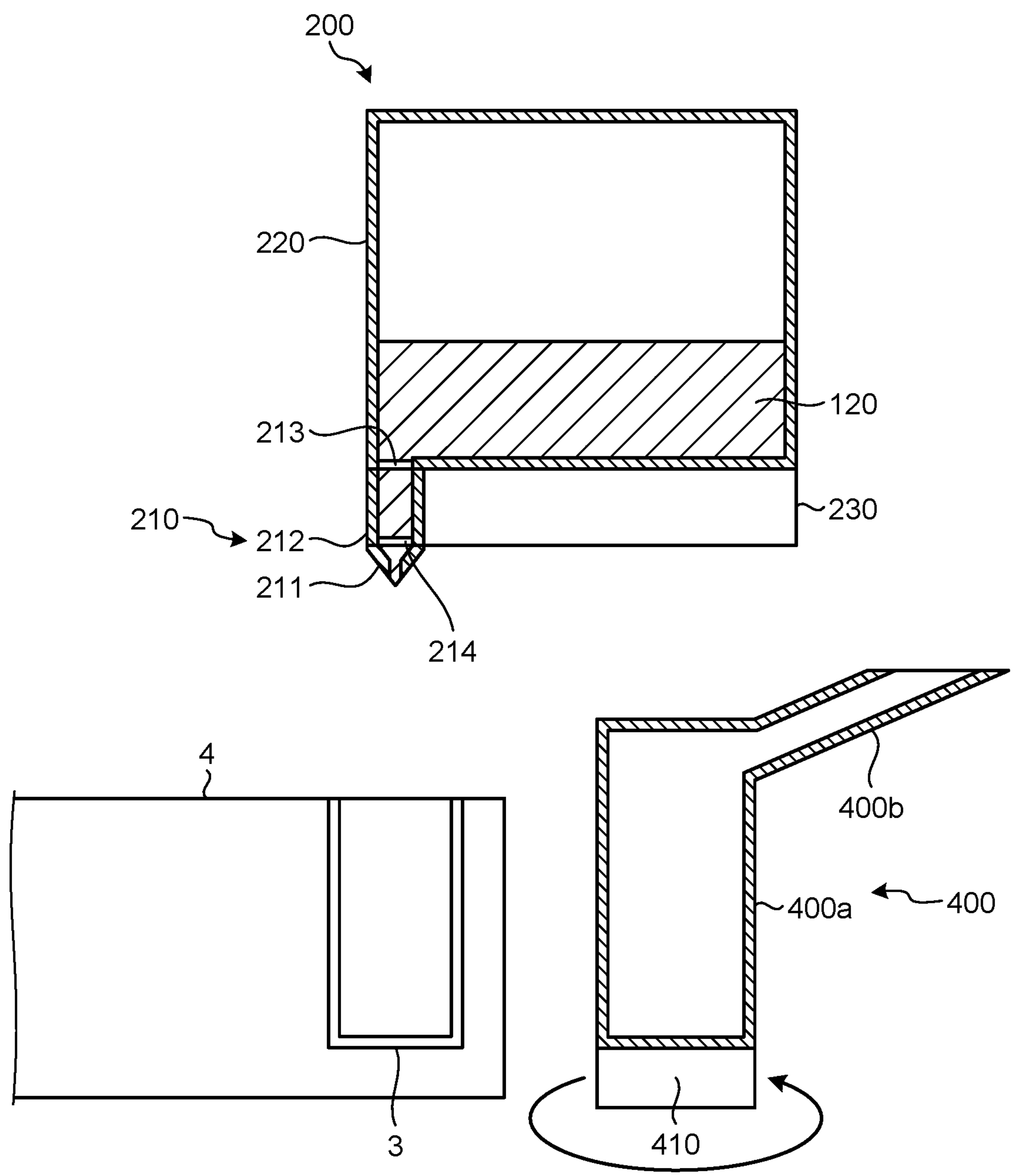
FIG. 6A is a drawing for explaining a disposal process performed by an automatic analyzing device according to a first modification example of the present embodiment, presented as a cross-sectional view illustrating configurations of a reaction disk, a reaction cuvette, a reagent cartridge, and a disposal unit.
Figure 6B:
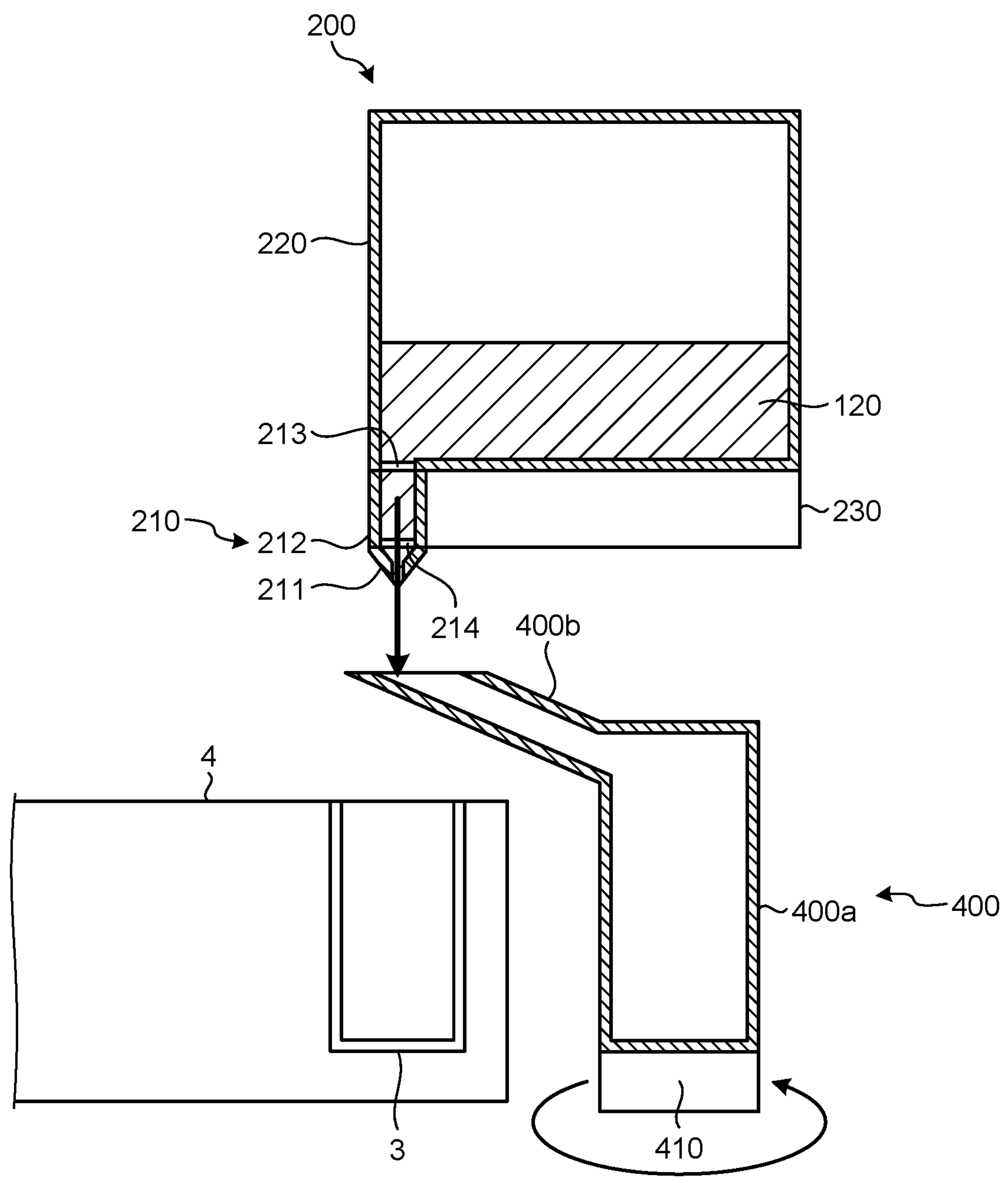
FIG. 6B is another drawing for explaining the disposal process performed by the automatic analyzing device according to the first modification example of the present embodiment, presented as a cross-sectional view illustrating configurations of the reaction disk, the reaction cuvette, the reagent cartridge, and the disposal unit.

FIGS. 6A and 6B are drawings for explaining a disposal process performed by the automatic analyzing device 100 according to the first modification example of the present embodiment, presented as a cross-sectional view illustrating configurations of the reaction disk 4, the reaction cuvette 3, the reagent cartridge 200, and a disposal unit 400.

As illustrated in FIG. 6A, in the automatic analyzing device 100 according to the first modification example of the present embodiment, the analyzing device 70 includes the disposal unit 400 and a supporting unit 410 configured to rotatably support the disposal unit 400. The disposal unit 400 and the supporting unit 410 are provided in the vicinity of the reaction disk 4.

For example, in FIG. 6A, the disposal unit 400 and the supporting unit 410 are provided on the outside of the reaction disk 4 while being positioned on a straight line connecting a rotation axis of the reaction disk 4 to a reagent dispense position. In this situation, the reagent dispense position denotes a position in which the dispense unit 211 of the reagent cartridge 200 rotated in the reagent storage intersects an opening of the reaction cuvette 3 rotated on the reaction disk 4. Although the disposal unit 400 and the supporting unit 410 are provided on the outside of the reaction disk 4 in the example illustrated in FIG. 6A, being provided on the inside of the reaction disk 4 is also acceptable as long as the disposal unit 400 and the supporting unit 410 are positioned on the straight line connecting the rotation axis of the reaction disk 4 to the reagent dispense position.

The disposal unit 400 is a container used for disposing of the reagent 120 in the reagent cartridge 200 and includes a disposal unit main body 400*a* and a spout unit 400*b* allowed to communicate with the disposal unit main body 400*a*. One end of the spout unit 400*b* is provided in an upper part of the disposal unit main body 400*a*, whereas the other end of the spout unit 400*b* has an opening formed therein.

For example, in the automatic analyzing device 100 according to the first modification example of the present embodiment, when a set time period has elapsed since the reagent 120 in the reagent cartridge 200 was dispensed, the reagent 120 in the flow path 210 of the reagent cartridge 200 is disposed of into the disposal unit 400. More specifically, when the set time period has elapsed since the reagent 120 was dispensed, the controlling function 32 of the processing device 90 outputs, to the driving device 80, a control signal to dispose of the reagent 120 in the flow path 210 of the reagent cartridge 200. As illustrated in FIG. 6A, in response to the control signal, the driving device 80 drives the supporting unit 410 so as to rotate the disposal unit 400 to the position of the dispense unit 211 of the reagent cartridge 200, so that the dispense unit 211 of the reagent cartridge 200 is positioned above the opening formed in the spout part 400*b* of the disposal unit 400. Further, as illustrated in FIG. 6B, the driving device 80 drives the dispensing mechanism 230 of the reagent cartridge 200 so as to dispose of the reagent 120 in the flow path 210 of the reagent cartridge 200, into the disposal unit 400.

Second Modification Example

In the automatic analyzing device 100 according to a second modification example of the present embodiment, the reagent 120 in the flow path 210 of the reagent cartridge 200 is disposed of into one of the reaction cuvettes 3 after a measuring process (hereinafter, "post-measurement reaction cuvette 3").

Figure 7:
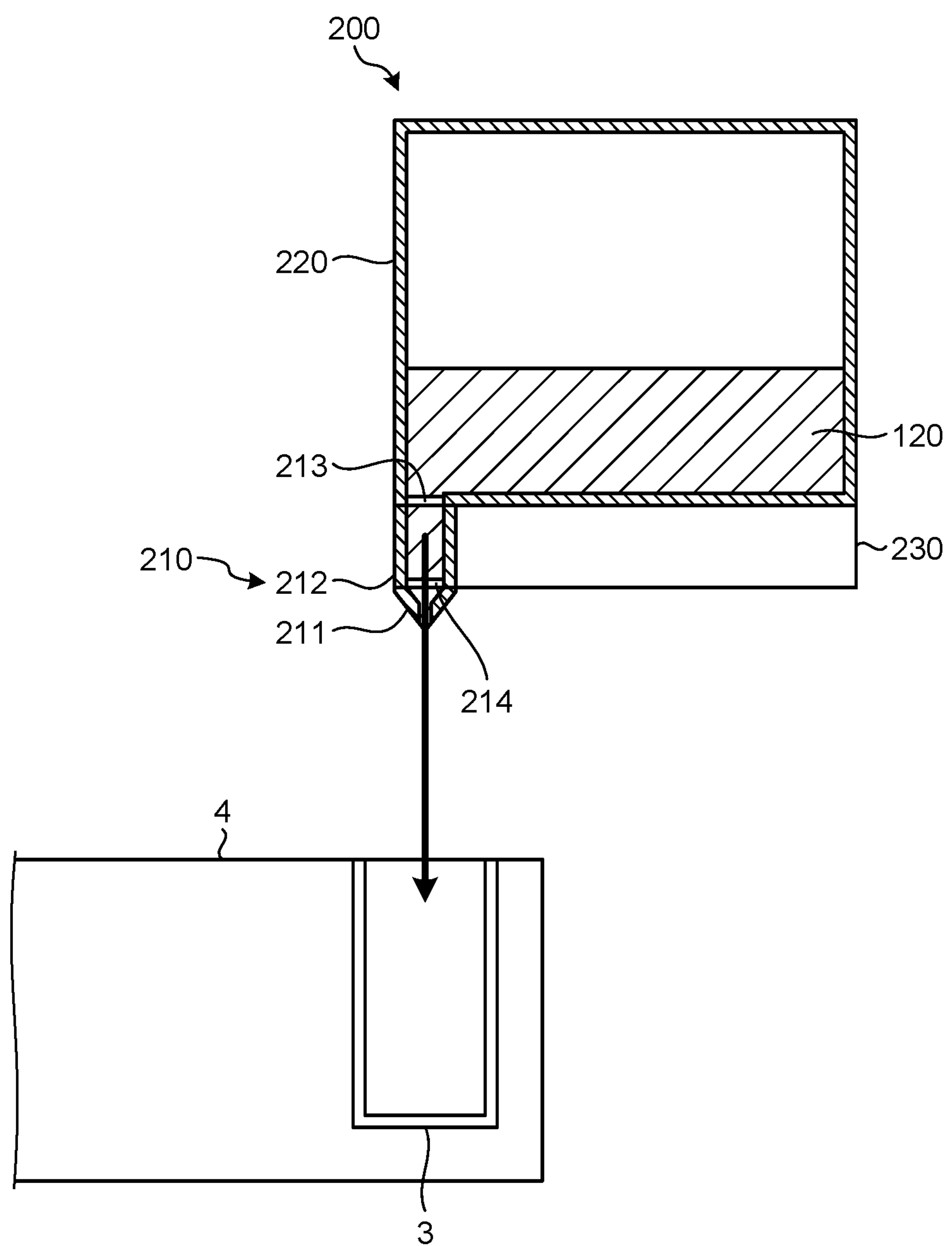
FIG. 7 is a drawing for explaining a disposal process performed by an automatic analyzing device according to a second modification example of the present embodiment, presented as a cross-sectional view illustrating configurations of a reaction disk, a reaction cuvette, and a reagent cartridge.

FIG. 7 is a drawing for explaining a disposal process performed by the automatic analyzing device 100 according to the second modification example of the present embodiment, presented as a cross-sectional view illustrating configurations of the reaction disk 4, the reaction cuvette 3, and the reagent cartridge 200. In the second modification example of the present embodiment, the post-measurement reaction cuvette 3 is used for disposing of the reagent 120. For example, in the automatic analyzing device 100 according to the second modification example of the present embodiment, when a set time period has elapsed since the reagent 120 in the reagent cartridge 200 was dispensed, the reagent 120 in the flow path 210 of the reagent cartridge 200 is disposed of into the post-measurement reaction cuvette 3.

Third Modification Example

In the automatic analyzing device 100 according to a third modification example of the present embodiment, the reagent 120 in the flow path 210 of the reagent cartridge 200 is disposed of, into a disposal unit provided in the reaction disk 4.

Figure 8:
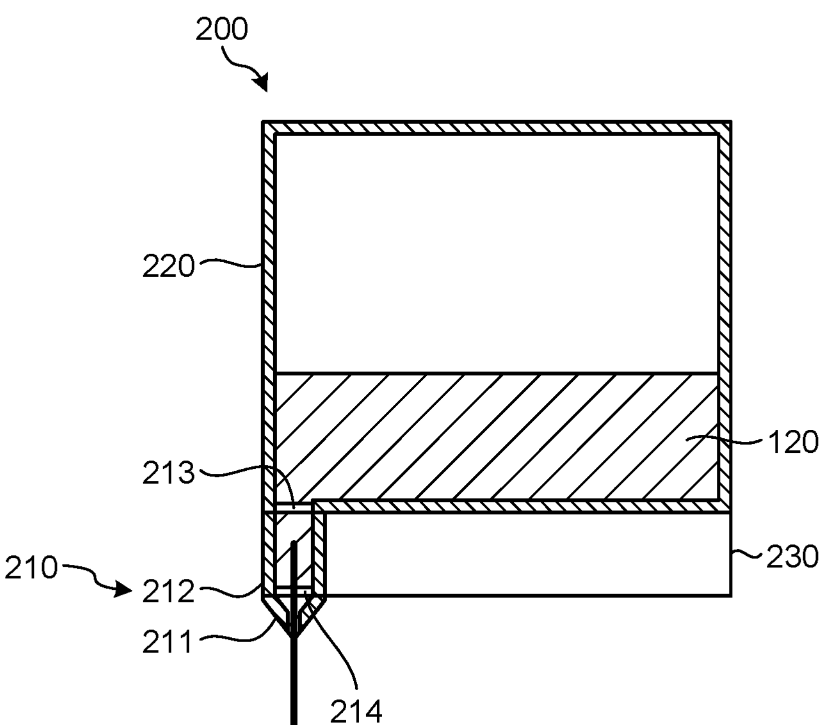
FIG. 8 is a drawing for explaining a disposal process performed by an automatic analyzing device according to a third modification example of the present embodiment, presented as a cross-sectional view illustrating configurations of a reaction disk, a reagent cartridge, and a disposal unit.
Figure 8:
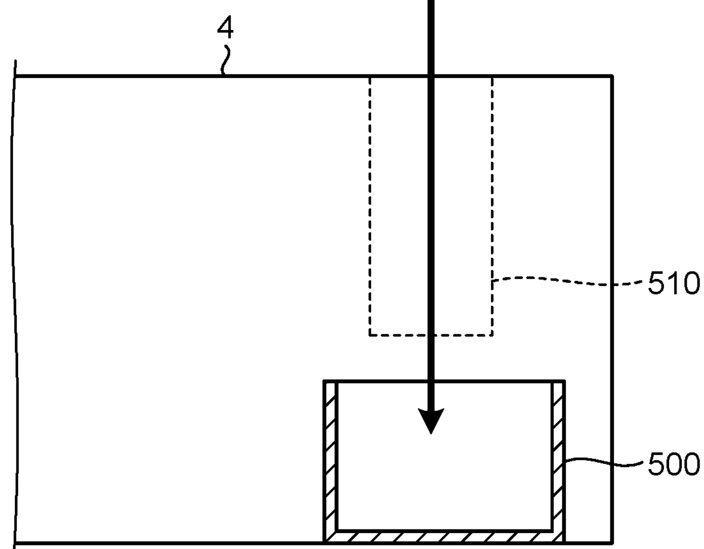

FIG. 8 is a drawing for explaining a disposal process performed by the automatic analyzing device 100 according to the third modification example of the present embodiment, presented as a cross-sectional view illustrating configurations of the reaction disk 4, the reagent cartridge 200, and a disposal unit 500.

As illustrated in FIG. 8, in the automatic analyzing device 100 according to the third modification example of the present embodiment, the analyzing device 70 includes the disposal unit 500. The disposal unit 500 is provided in the reaction disk 4. The disposal unit 500 is a container used for disposing of the reagent 120 in the reagent cartridge 200. An opening is formed in an upper part of the disposal unit 500.

Further, in the third modification example of the present embodiment, the constant temperature tank of the reaction disk 4 is an air tank. In this situation, as for a recess part 510 corresponding to the reaction cuvette 3 and being formed as a plate-like member covering the air tank, an opening is formed in a part of a bottom part of the recess part 510. Further, inside the reaction disk 4, the disposal unit 500 is provided beneath the bottom part of the recess part 510. The reaction cuvette 3 is taken out of the reaction disk 4 after a measuring process. For example, in the automatic analyzing device 100 according to the third modification example of the present embodiment, when a set time period has elapsed since the reagent 120 in the reagent cartridge 200 was dispensed, the reagent 120 in the flow path 210 of the reagent cartridge 200 is disposed of, into the disposal unit 500.

According to at least one aspect of the embodiments described above, it is possible to improve efficiency in the measuring process.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An automatic analyzing device comprising: a reagent cartridge that includes a storing unit configured to store therein a reagent, a flow path configured to dispense the reagent from the storing unit, and a dispensing mechanism configured to dispense the reagent into a reaction cuvette through the flow path; and processing circuitry configured to control the dispensing mechanism so as to dispose of the reagent in the flow path, wherein the reagent cartridge includes a supply unit configured to supply the reagent in the storing unit to the dispensing mechanism and a valve provided between the storing unit and the supply unit, and the processing circuitry is configured to control the dispensing mechanism to change a shape of a lateral wall of the supply unit in a direction such that a volume of the supply unit is configured to increase and configured to let the reagent in the storing unit flow into the supply unit, and control the dispensing mechanism to change the shape of the lateral wall of the supply unit in a direction such that the volume of the supply unit is configured to decrease and configured to let the reagent in the supply unit be dispensed from a dispense unit and be supplied to the reaction cuvette.

2. The automatic analyzing device according to claim 1, wherein the reagent cartridge further includes the dispense unit configured to dispense the reagent, and the flow path is formed in the dispense unit.

3. The automatic analyzing device according to claim 1, wherein, when a set time period has elapsed since the reagent was dispensed, the processing circuitry is configured to control the dispensing mechanism so as to dispose of the reagent in the flow path.

4. The automatic analyzing device according to claim 3, wherein the set time period is set for each type of reagent.

5. The automatic analyzing device according to claim 3, wherein the set time period is set for each test item.

6. The automatic analyzing device according to claim 3, wherein the set time period is set by a user.

7. The automatic analyzing device according to claim 1, wherein the processing circuitry is configured to control the dispensing mechanism so as to dispose of the reagent in the flow path before the reagent is dispensed.

8. The automatic analyzing device according to claim 7, wherein the processing circuitry is configured to control the dispensing mechanism so as to dispose of the reagent in the flow path, in an idle cycle during which the reagent is not dispensed.

9. The automatic analyzing device according to claim 8, wherein the processing circuitry is configured to make the idle cycle, before the reagent in the flow path is disposed of.

10. The automatic analyzing device according to claim 7, wherein, when the reagent cartridge has been replaced with a new reagent cartridge, the processing circuitry is configured to control the dispensing mechanism so as to dispose of the reagent in a flow path in the new reagent cartridge.

11. The automatic analyzing device according to claim 1, further comprising:

a disposal unit configured to dispose of the reagent, wherein the processing circuitry is configured to control the dispensing mechanism so as to dispose of the reagent in the flow path into the disposal unit.

12. The automatic analyzing device according to claim 1, further comprising:

a reaction disk configured to rotatably hold the reaction cuvette and provided with a disposal unit, wherein the processing is configured to control the dispensing mechanism so as to dispose of the reagent in the flow path into the disposal unit in the reaction disk.

13. The automatic analyzing device according to claim 1, further comprising:

a reaction disk configured to rotatably hold the reaction cuvette, wherein the processing circuitry is configured to control the dispensing mechanism so as to dispose of the reagent in the flow path into the reaction cuvette before being cleaned that is in the reaction disk.

14. The automatic analyzing device according to claim 1, further comprising:

an output device configured to output information indicating that the reagent has been disposed of.

* * * * *